Feb. 20, 1940. S. B. VON THYSSEN-BORNEMISZA 2,190,959
GRAVITY MEASURING INSTRUMENT
Filed Oct. 15, 1938
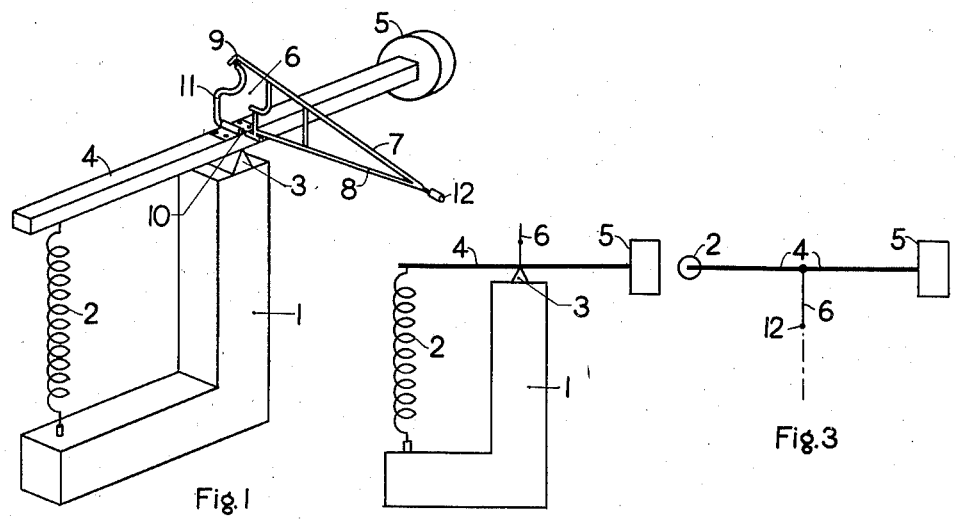
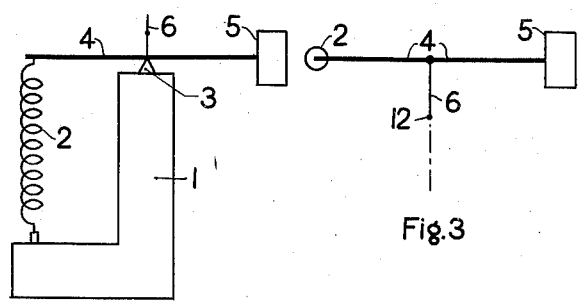
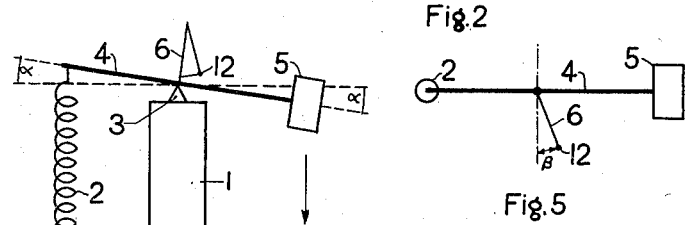
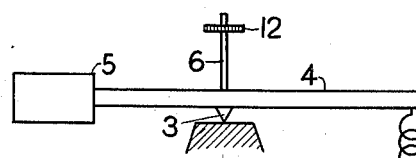
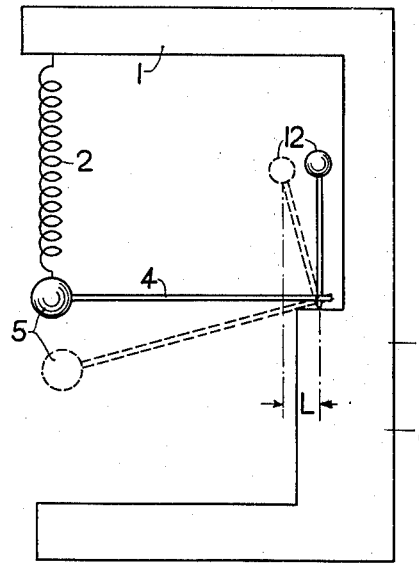
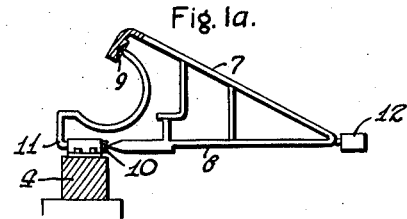
Inventor:
Stephan Baron von Thyssen-Bornemisza
By his Attorney:

Patented Feb. 20, 1940

2,190,959

UNITED STATES PATENT OFFICE 2,190,959

GRAVITY MEASURING INSTRUMENT

Stephan Baron von Thyssen-Bornemisza, Hanover, Germany, assignor to Shell Development Company, San Francisco, Calif., a corporation of Delaware Application October 15, 1938, Serial No. 235,190
In Germany January 17, 1934

4 Claims. (Cl. 265—1.4)

This invention pertains to instruments for the measurement of variations of gravitational acceleration, and is a continuation-in-part of my copending application Serial No. 742,878, filed September 6, 1934, for a Gravity measuring instrument.

The present invention relates more specifically to a gravity meter consisting of a lever system acted upon by a mass capable of changing its position in response to variations of the gravitational acceleration, and by resilient or spring means tending to oppose any change of position of the system due to an increase of gravitational acceleration. A projecting member is attached to the lever in a plane passing through the fulcrum at right angles to the longitudinal axis of the lever, said member supporting an auxiliary mass in such a manner that any change of position of the lever system in response to variations of gravitational acceleration results in a shift of the position of the center of gravity of said auxiliary mass with regard to the fulcrum and causes a further displacement of the lever system, whereby the effect of variations of gravitational acceleration causing the original displacement of the system is intensified or amplified.

The present invention will be understood from the following description taken with reference to the attached drawing, wherein:

Fig. 1 is a perspective view of a preferred embodiment of the present instrument wherein the projecting member supporting the auxiliary mass extends laterally of the lever.

Fig. 1a is an elevation view showing on a larger scale the arrangement of Fig. 1.

Figs. 2 and 3 show diagrammatically a side elevation and a plan view, respectively, of the instrument of Fig. 1 in a position of equilibrium with the lever perfectly horizontal.

Figs. 4 and 5 give the same views of the same instrument in a tilted position resulting from an increase of gravitational acceleration.

Figs. 6 and 7 show diagrammatic elevation views of two other embodiments of the present invention wherein the projecting member supporting the auxiliary mass extends vertically of the lever.

Referring to Fig. 1, a base 1 supports a knife edge 3, serving as a fulcrum for a beam or lever 4. A mass 5 is affixed to one end of the lever 4, while the other end of the lever is attached to the base 1, or any other fixed point, by means of a resilient member, such as a spring 2, which may, if desired, comprise two portions of opposed twist to compensate for the effect of temperature variations.

A projecting member 6, forming in effect a horizontal pendulum, is supported by the lever 4 above the knife edge 3, and consists of a metal frame comprising bars 7 and 8, forming an angle between their outer ends, which may, if desired, support an auxiliary mass 12, said bars resting with points of their other ends against bearings 9 and 10 on a member 11 fixedly attached to the lever, in such a manner as to form a triangular frame which is pivotally mounted and supported on said bearings 9 and 10. The lower end of member 11, which is rigid with the lever 4, forms a somewhat recessed bearing 10 receiving the pressure of the pointed pivot of bar 8. In a similar manner, the upper pointed end of member 11 presses against a somewhat recessed bearing 9 provided on the upper end of bar 7. This construction permits the horizontal pendulum formed by bars 7 and 8 and mass 12 to pivot about an axis including pivotal points or bearings 9 and 10. When the lever 4 is in a perfectly level position, the triangular frame 6 lies in a vertical plane passing through the knife edge fulcrum at right angles to the longitudinal axis of said lever, as seen from Figs. 2 and 3.

When operating the present gravity meter, the balance beam or lever 4 and the horizontal pendulum 6 are released at the start of the measurements, the spring 2 remaining fixed. Any deflection of the lever 4 from a horizontal direction will cause a corresponding swing of the horizontal pendulum 6 towards that side of the lever 4 which occupies the lowermost position. For example, as seen from Figs. 4 and 5, a downward displacement of the mass 5 through a vertical angle $\alpha$ will result in a swing of the horizontal pendulum 6 through an angle $\beta$ towards said mass 5, said angle $\beta$ lying in a plane parallel to the longitudinal axis of the lever 4. The auxiliary mass 12 will therefore be located to the same side of the fulcrum 3 as the mass 5 and will cooperate with the latter in causing a further downward displacement of that side of the lever 4 which supports the mass 5. After the instrument comes to a state of equilibrium, the position of the horizontal pendulum may be determined by means of a suitably located graduation scale, combined, if desired, with suitable magnifying means, such as a microscope. After the reading has been taken, the lever 4 and horizontal pendulum 6 are locked again (by means of protective locking devices not shown on the drawing), and the instrument is transported to a new location, wherein measurements are effected in the same manner as before. Any difference in gravitational acceleration will cause the horizontal pendulum to assume a new position, which is determined and recorded, said difference in gravitational acceleration being easily calculated from the data obtained. When the desired reading has been taken, the lever and pendulum are locked again, and the spring 2 is temporarily released for spring tension compensation, after which the device is operated again in order to obtain a basic reading before going to a new location, the reading at this third position being referred to said basic reading.

Fig. 6 shows a somewhat different embodiment of the present device, wherein the auxiliary mass 12 is supported by a rigid projecting member 6 extending vertically of the lever 4 in a vertical plane passing through the fulcrum 3 at right angles to the lever 4. In this embodiment, the mass 5 and the spring 2, opposing its movement in response to increases in gravitational acceleration, are located to the same side of the fulcrum. It will be seen that any downward deflection of the lever 4 will bring into action an auxiliary moment equal to the product of the auxiliary mass 12 by the lever arm L, said auxiliary moment being effective in amplifying the original downward motion of the mass 5.

Fig. 7 shows an embodiment of the present invention which is substantially equivalent to that of Fig. 6, the mass 5 and spring 2 being in this case affixed to the lever 4 on different sides of the fulcrum 3.

It is understood that in effecting a series of measurements by means of the present device, the lever 4 does not necessarily have to be level at the start of said measurements, but may be positioned at any desired angle to a horizontal plane. It must be noted in this connection that in instruments of this type heretofore used, it was usually considered desirable to arrange at least one of the arms of the lever 4 at as great an angle to the horizontal as possible, in order that the change in the gravitational acceleration may result in a greatly magnified relative increase of the lever arm of the mass, or decrease of the lever arm of the opposing spring. It has been found, however, that no such arrangement is necessary with the device of the present invention, since a sufficiently high amplification of the effect of any change in gravitational acceleration may be obtained, owing to the action of the auxiliary mass, even with the lever 4 in an approximately horizontal position. It has further been found that although, for example, a greater amplification of a 5° displacement of the lever may be obtained when said lever is originally arranged at a 70° angle with the horizontal than when said lever is arranged at a 20° angle with the horizontal, it is not desirable to arrange the lever 4 of the present device in an original position deviating by more than 30° with the horizontal, since the excessively increased sensitivity of the apparatus makes it in such cases subject to random disturbing influences, such as changes in the elasticity of the spring, deviations from Hooke's law, etc. With the lever 4 arranged, as stated above, at an original angle from 0 to 30° with the horizontal, the present device is capable of effecting very accurate measurements and has a sensitivity of the order or in excess of 0.1 milligal.

I claim as my invention:

1. A gravity meter comprising a lever, a fulcrum supporting said lever, a mass attached to said lever on one side of said fulcrum, spring means connecting said lever to a fixed point and adapted to oppose any downward movement of said mass, a projecting member attached to the lever in a plane passing through the fulcrum and perpendicular to the longitudinal axis of the lever, and a second mass supported by said member.

2. A gravity meter comprising a lever, a knife edge fulcrum supporting said lever, a mass attached to said lever on one side of said fulcrum, spring means connecting said lever to a fixed point and adapted to oppose any downward movement of said mass, a projecting member attached to the lever in a plane passing through the knife edge and perpendicular to the longitudinal axis of the lever, and a second mass pivotally supported by said member for rotational movement about a line perpendicular to the knife edge and to the longitudinal axis of the lever.

3. A gravity meter comprising a lever, a knife edge fulcrum supporting said lever at one end thereof, a mass attached to said lever at its other end, spring means connecting said lever to a fixed point and adapted to oppose any downward movement of said mass, a projecting member rigidly attached to the lever in a plane passing through the knife edge and perpendicular to the longitudinal axis of the lever, and a second mass supported by said member, the center of gravity of said mass lying in said plane.

4. A gravity meter comprising a lever, a knife edge fulcrum supporting said lever, a mass attached to said lever on one side of fulcrum, spring means attached to said lever on the other side of said fulcrum, said spring means connecting the lever to a fixed point and being adapted to oppose any downward motion of said mass, a projecting member rigidly attached to the lever in a plane passing through the knife edge and perpendicular to the longitudinal axis of the lever, and a second mass supported by said member, the center of gravity of said mass lying in said plane.

STEPHAN BARON v.
THYSSEN-BORNEMISZA.